United States Patent
Grenning

(10) Patent No.: US 9,205,293 B2
(45) Date of Patent: Dec. 8, 2015

(54) FLUID FLOW TESTING SYSTEM

(71) Applicant: Frederick H. Grenning, Lake Bluff, IL (US)

(72) Inventor: Frederick H. Grenning, Lake Bluff, IL (US)

(*) Notice: Subject to any disclaimer, the term of this patent is extended or adjusted under 35 U.S.C. 154(b) by 206 days.

(21) Appl. No.: 14/084,775

(22) Filed: Nov. 20, 2013

(65) Prior Publication Data

US 2015/0135821 A1    May 21, 2015

(51) Int. Cl.
*G01L 5/14* (2006.01)
*A62C 37/50* (2006.01)
*G01F 1/56* (2006.01)
*G01F 1/34* (2006.01)
*G01F 25/00* (2006.01)
*G01M 1/00* (2006.01)

(52) U.S. Cl.
CPC . *A62C 37/50* (2013.01); *G01F 1/34* (2013.01); *G01F 1/56* (2013.01); *G01F 25/0007* (2013.01); *G01M 1/00* (2013.01)

(58) Field of Classification Search
None
See application file for complete search history.

(56) References Cited

U.S. PATENT DOCUMENTS

| | | | |
|---|---|---|---|
| 7,917,324 B2 | 3/2011 | Hurley | |
| 7,983,869 B1 | 7/2011 | Hurley | |
| 8,150,555 B2* | 4/2012 | Hinami et al. | 700/289 |
| 8,401,811 B1 | 3/2013 | Hurley | |
| 8,712,591 B2* | 4/2014 | Receveur | 700/282 |
| 2010/0163123 A1 | 7/2010 | Earle | |
| 2012/0226449 A1* | 9/2012 | Delache et al. | 702/45 |
| 2012/0239336 A1* | 9/2012 | Delache et al. | 702/100 |
| 2013/0253857 A1* | 9/2013 | Hershey | 702/55 |
| 2014/0124057 A1* | 5/2014 | Freund et al. | 137/455 |

* cited by examiner

*Primary Examiner* — Peter Macchiarolo
*Assistant Examiner* — Jermaine Jenkins
(74) *Attorney, Agent, or Firm* — Miller, Matthias & Hull LLP

(57) ABSTRACT

A system and corresponding method for testing fire pumps installed in buildings uses a sensor hub to gather measurement data from one or more pressure sensors installed in corresponding water conduits. The sensor hub broadcasts data related to water flow at the water conduit or conduits to a computer where the information from the sensors is converted to a total water flow through all water conduits. The total water flow is combined with other data about pump operation to determine whether the pump is operating within predetermined requirements. The computer may also analyze a photograph of a placard on the pump to determine model and other operating information from the pump.

18 Claims, 6 Drawing Sheets

FLUID FLOW TESTING SYSTEM

FIELD OF THE DISCLOSURE

The present disclosure relates generally to fluid flow testing and more particularly to methods and devices for capturing measurement data from a fire pump performance test.

BACKGROUND OF THE DISCLOSURE

Fire pumps, in addition to other pumping equipment, often must be tested to ensure the equipment meets certain performance requirements. The physical environment for fire pump testing can be challenging because a building's fire pump is almost universally indoors but the discharge of up to thousands of gallons a minute of water is almost universally outdoors. Accurately measuring the high water flow rates associated with fire pumps is done at the outlet of the discharge hose or pipe, as is discussed in the related patent application to the same inventor referenced above.

Prior art test systems use one person at the water outlet with a radio to set the water flow and then alert another person at the fire pump that the flow rate has reached a required level so that pump-related measurements may be taken by the other person. Alternatively, one person may set the water flow rate, assume that the rate will remain constant and then enter the building to record the fire pump data and return outside to turn off the water. The former method is costly in terms of manpower, the latter is costly in terms of the extra water expended during the test, given that several thousand gallons of water a minute may be dumped into a street or storm. It is common for some tests to take 30 minutes or more resulting in very high water consumption during the test.

In order to achieve the flow required, several different outlet pipes or hoses may be used, so that setting the water flow to the required rate may require resetting some valves as other are adjusted.

SUMMARY

A sensor hub coupled to pressure sensors at different outlet conduits may gather sensor voltage or pressure readings and relay those readings to a computer for use in confirming flow rates when recording fire pump data. If the sensor outputs a voltage reading, the voltage reading may be converted at the sensor hub to a pressure value according to conversion routines or tables stored at the sensor hub. The sensor hub may transmit either the sensor raw data or the pressure value to the computer via wireless network. The computer can use the pressure readings to calculate both the flow at each outlet conduit as well as the total flow rate.

In so doing, the status of the output flow rate may be monitored by the person at the fire pump so that fire pump data readings may be taken promptly when the flow rate is correct. This may reduce or eliminate the need for an outside person whose role is to inform the inside person when the flow rate is acceptable.

Further, if a pump output control valve is available at the fire pump, the outside valves may all be opened and the overall flow rate can be adjusted from inside the fire pump room and continuously monitored at the computer. This both eliminates the need for the outside person and minimizes the amount of time water flow is flowing into the street or drain. This controls not only cost but also controls the consumption of valuable water.

Additional sensors that measure pump characteristics such as voltage, amperage, and RPM may also be used to automatically capture pump data during operation. This further improves the fire pump test cycle by reducing or eliminating the need for the test operator to manually enter pump data and correspondingly reduces the opportunities to misread or improperly record the test data.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE DISCLOSURE

Figure 1:
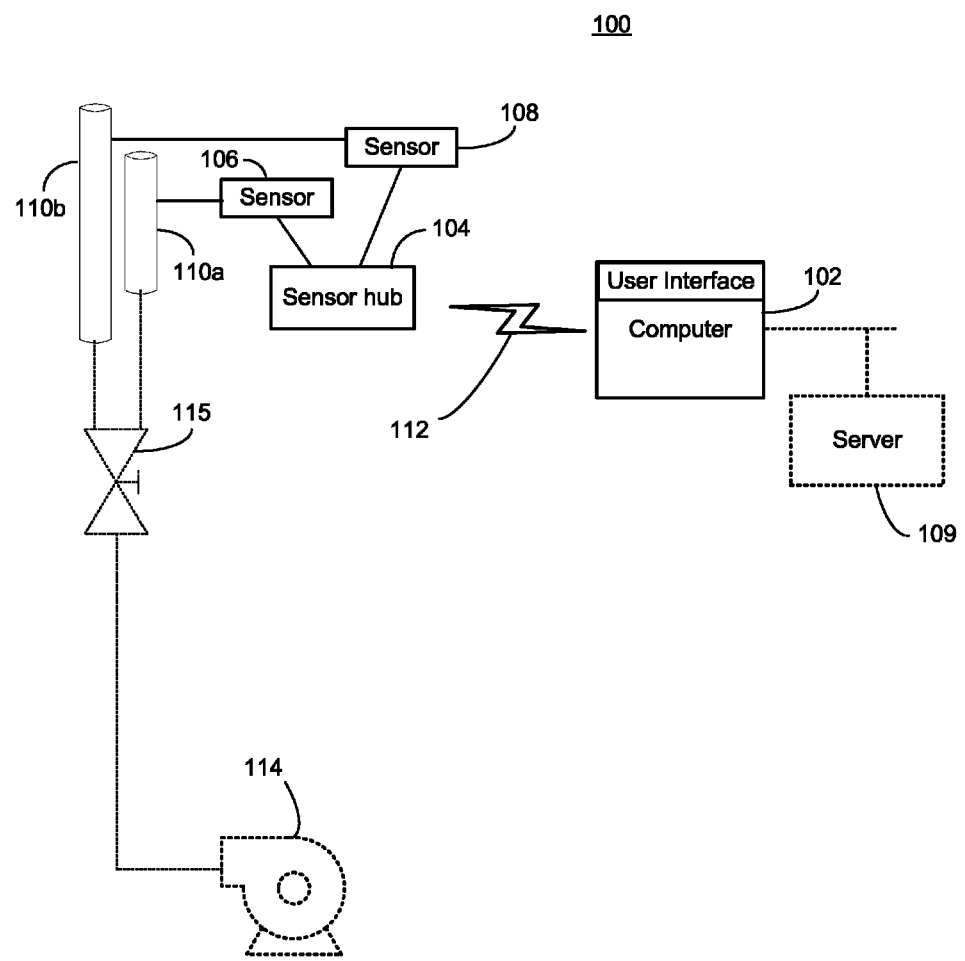
FIG. 1 is a block diagram of an embodiment of a fire pump test system.

Referring to FIG. 1, a system 100 for testing a fire pump may include a computer 102 and a sensor hub 104. The sensor hub 104 may receive data from one or more sensors represented by exemplary sensors 106 and 108. The number of conduit sensors may vary based on the number of conduits 110a, 110b required to achieve a desired water flow rate. In an embodiment, the sensors 106 and 108 may be piezo-electric pressure sensors.

Other sensors, such as pitot tube-type flow sensors, may also be used. In other embodiments, fewer or more sensors may be coupled to the sensor hub 104. For example, the piping or hose discharge system may include multiple pipe segments illustrated by conduits 110a and 110b. In yet other embodiments, additional sensors coupled to other sensor hubs (not depicted) may be used when collecting data from additional locations.

The system 100 may also include a computer 102 with a user interface for collecting and displaying information about the fire pump test. While not part of the fire pump test system 100, also illustrated are fire pump 114, valve 115, and conduits 110a and 110b. In some embodiments, the computer 102 may be coupled to a server 109. The server 109 may be a source of data about pumps for use in developing pump test results. In other embodiments, the server 109 may represent an "authority having jurisdiction" or AHJ that may receive fire pump test information and determine whether the fire pump 114 meets the local requirements for such pumps.

The computer 102 may be connected to the sensor hub 104 via a wireless network 112. The wireless network 112 may be any of several known wireless networks, including, but not limited to a WiFi (802.11x) network, a Bluetooth® network, and a Zigbee® network. The computer 102 may be a laptop, tablet, smartphone, or even a desktop with suitable wireless connections to communicate via the wireless network 112.

Figure 2:
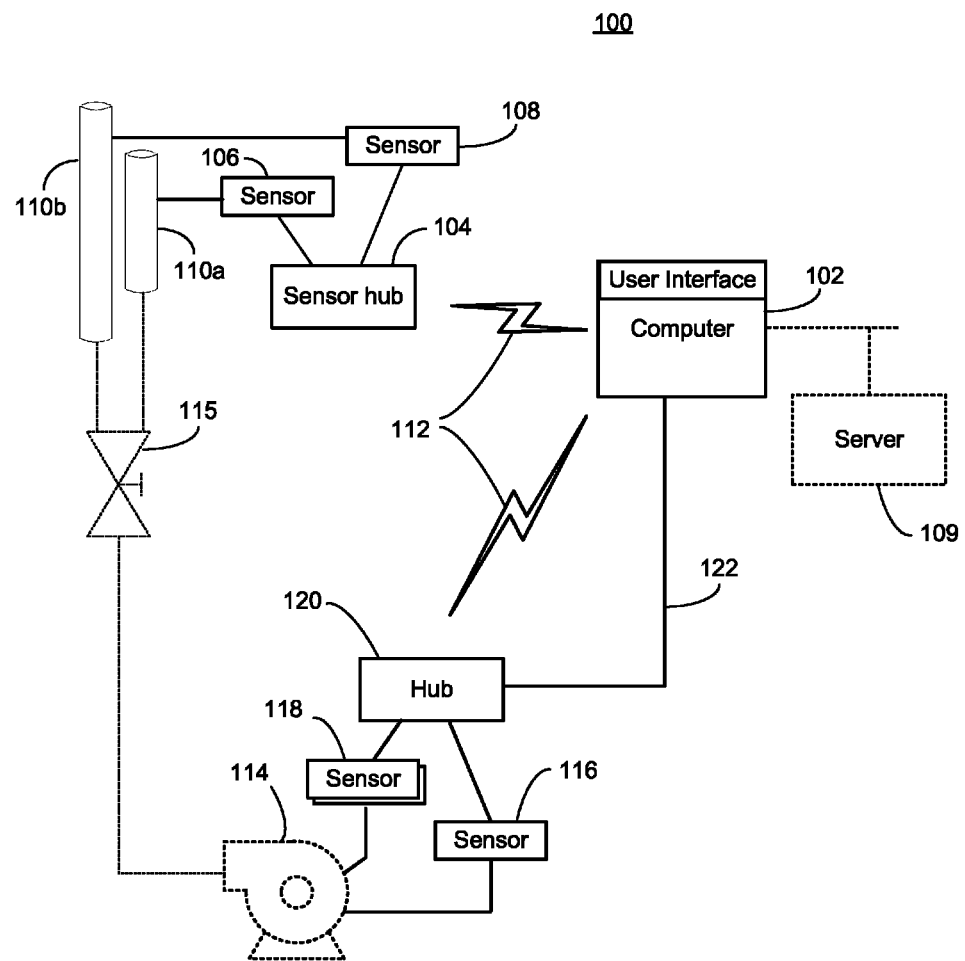
FIG. 2 is a block diagram of another embodiment of a fire pump test system.

FIG. 2 may be similar to FIG. 1, but also illustrates sensors 116 and 118 coupled to the fire pump 114. In the embodiment of FIG. 2, the sensors 116 and 118 may be connected to the computer 102 via a hub 120. The hub 120 may be the same as sensor hub 104, but, in other embodiments may be different according to the nature of sensors 116 and 118. For example, sensor 116 may be a voltmeter and sensor 118 may be an ammeter for measuring voltage and current, respectively. In this embodiment, the hub 120 may have different inputs and may condition the input signals differently than sensor hub 104. Because the environment where fire pump testing typically occurs may have a high amount of electromagnetic noise, the hub 120 may be connected to the computer 102 via a wired network 122. In other embodiments, the sensors 116 and 118, or similar sensors, may also include pressure sensors for measuring suction and discharge pressures of the pump 114.

Figure 3:
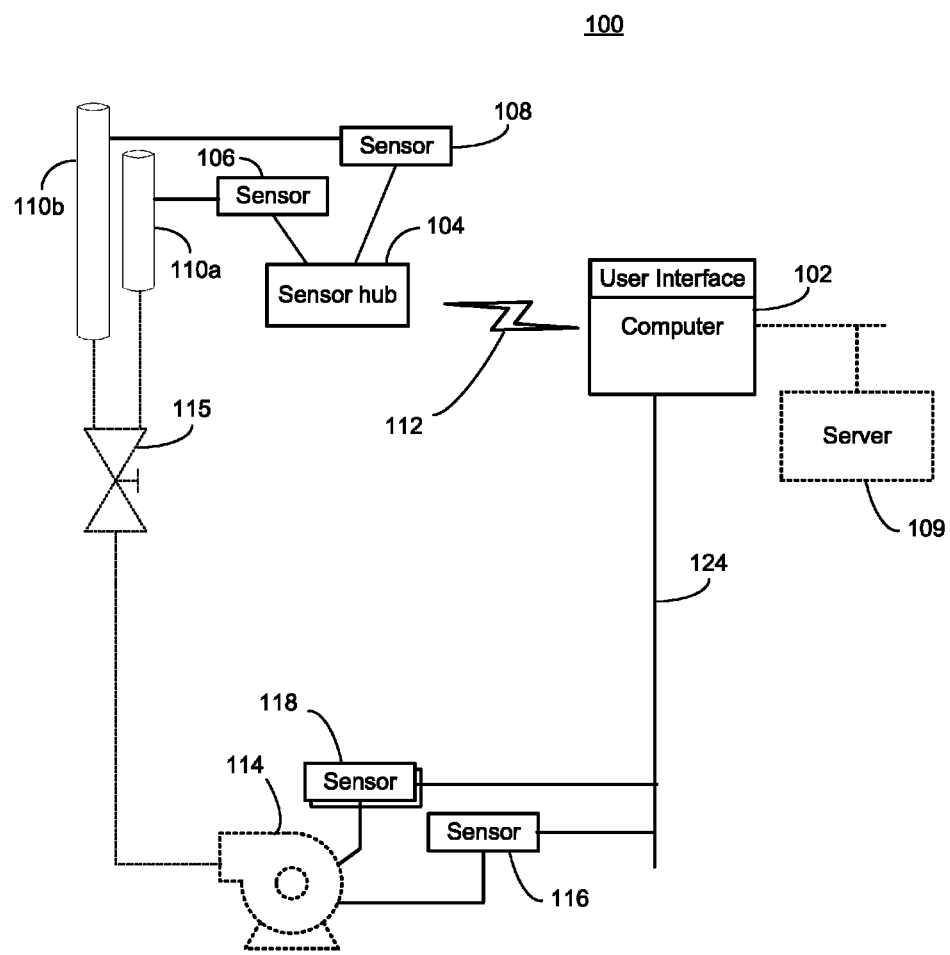
FIG. 3 is a block diagram of yet another embodiment of a fire pump test system.

FIG. 3 is an alternate embodiment that is similar to FIG. 2 but illustrates the sensors 116 and 118 directly connected to the computer 102. The connections may be via a wired network 124 or may be individual connections to separate inputs on the computer 102. The wired networks 122 and 124 may be Internet Protocol (IP) networks or any other known communication protocol suitable for use over a wired connection. In a high noise environment, a Foundation Fieldbus™ or other industrial communication protocol may be used.

Figure 4:
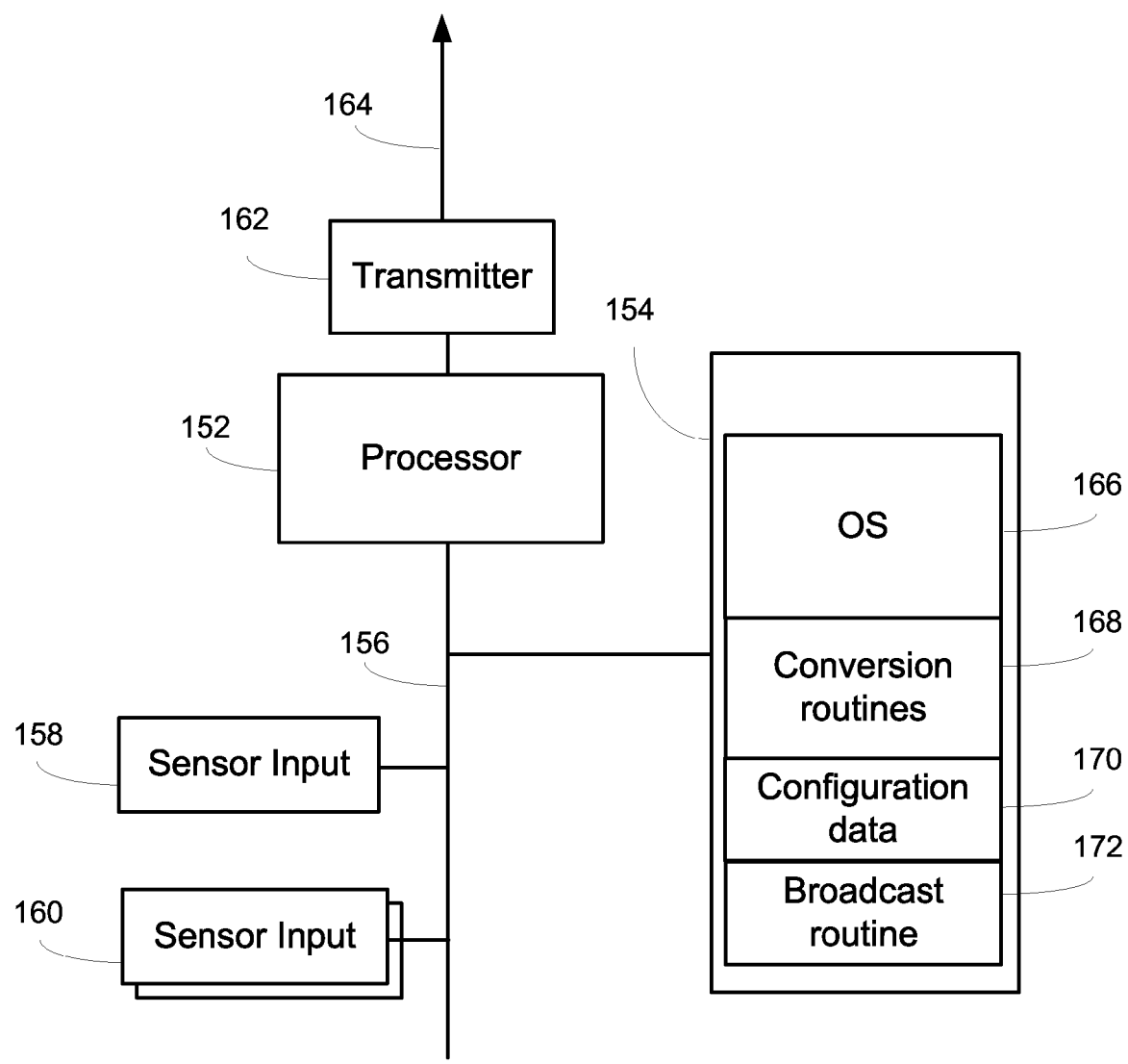
FIG. 4 is a block diagram of a sensor hub.

FIG. 4 illustrates an exemplary embodiment of a sensor hub 104. The sensor hub 104 may include a processor 152 and a memory 154 connected by a data bus 156. Sensor inputs 158 and 160 may provide a suitable interface to sensors 106 and 108. For example, if the sensor 106 has a voltage output, the sensor input 158 may be have a high impedance input. The sensor input may also include an analog-to-digital converter (ADC) (not depicted) for conversion of an analog signal from the sensor to a digital signal.

The sensor hub 104 may also include a transmitter 162 for use in communicating wirelessly with the computer 102. In an embodiment, the transmitter 162 may be part of a two-way transceiver (not depicted) that may accept data from the computer 102 or at least may be used to establish communication with the computer 102.

The memory 154 may store an operating system 166, conversion routines 168, and configuration data 170 among other utilities and routines used for startup and operation. The conversion routines 168 may convert, for example, a voltage value received from the sensor 106 to a pressure value. The conversion module 168 may consult the configuration data 170 to determine sensor type and to select an appropriate voltage-to-pressure curve, equation, or lookup table.

The memory 154 may also store a broadcast routine 172 used to collect, format, and manage transmission of data from the sensor hub 104 to the computer 102 via the transmitter 162.

Figure 5:
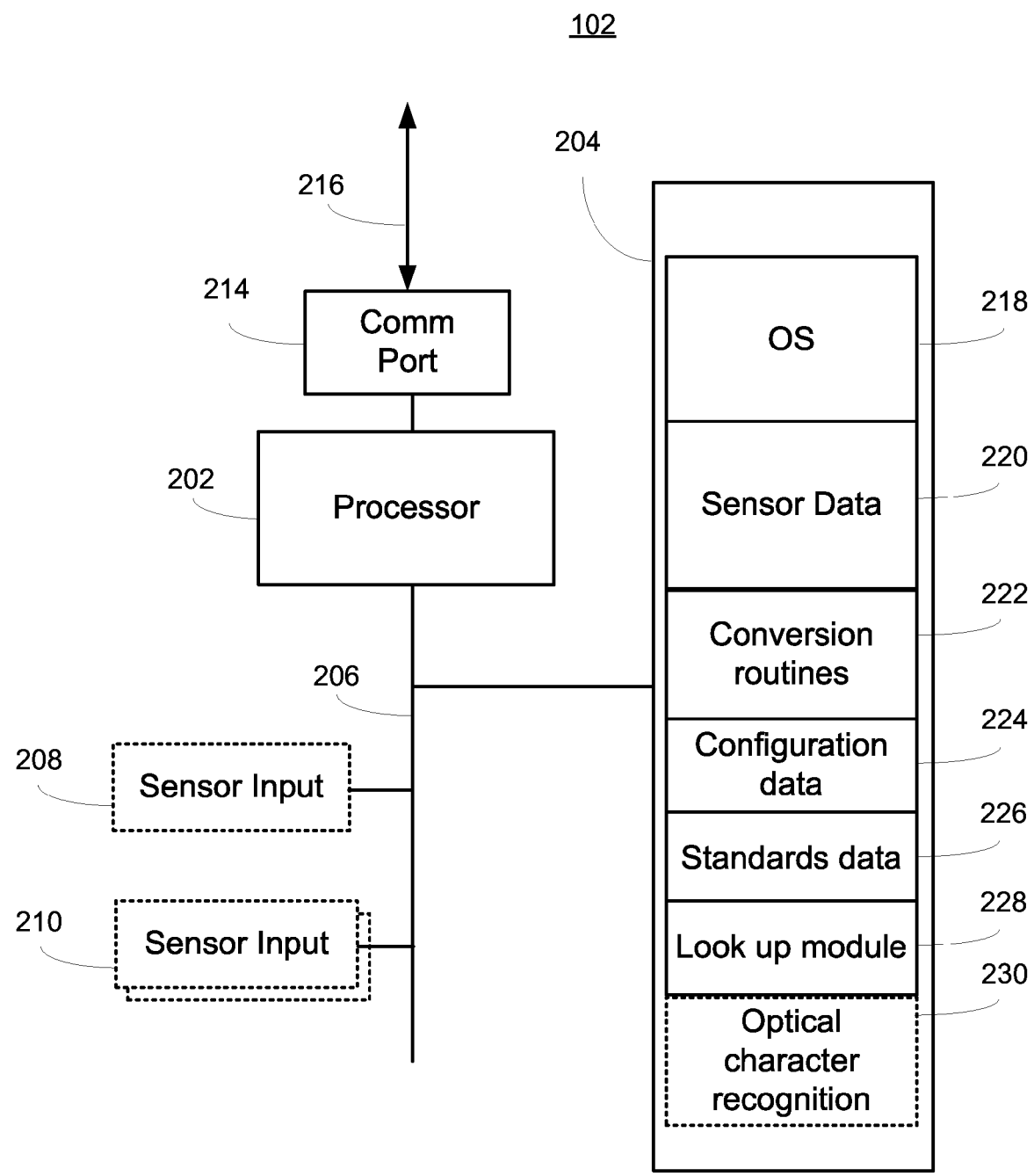
FIG. 5 is a block diagram of a computer configured for use in a fire pump test system.

FIG. 5 illustrates an exemplary embodiment of a computer 102, suitable for use in a fire pump test system 100. The computer 102 may include a processor 202 and a memory 204 coupled by a data bus 206. The computer 102 may optionally have sensor inputs 208 and/or 210 for use in an embodiment illustrated in FIG. 3 where the sensor may be directly connected to the computer. The computer 102 may also include a communication port 214 that couples to one or more networks 216 that may include a wireless network 112, a wired network 122, or both.

The memory 204 may include an operating system 218, such as Linux, Microsoft Windows, iOS, Android, etc. The memory 204 may also include sensor data 220 for use in converting pressure information from the conduit sensors 106 and 108, sensor hub 104, or pump sensors 116 and 118. Conversion routines 222 may perform calculations to convert pressure data to water flow rates or to calculate power input at a fire pump 114 using voltage and current measurements. Configuration data 224 may include specific pump model information such as flow rate and power ratings, as well as a configuration in use for water discharge, such as the number and type of conduits and/or the types of sensors used.

Standards data 226 may incorporate specific test requirements by jurisdiction so that known test performance requirements can be compared to actual results. Even if the final results may require certification by an AHJ, an initial pass/fail determination may be made on site using the stored standards data.

A lookup module 228 may gather information about the fire pump, such as model data and/or pump ratings. This information may be used to find additional relevant information, such as nominal and maximum flow limits, volt-ampere power ratings, RPM, etc. In some cases, the information may be stored locally in memory 204. In other embodiments, the lookup module 228 may access an external data store for such information, via, for example, the Internet.

In an optional embodiment, a camera (not depicted) may be used to capture an image of a fire pump placard, that may include model information, water flow, and power ratings. An optical character recognition module 230 may convert the image of the placard into digital information that may be used to populate the configuration data 224.

In operation, a fire pump test may include first running a churn test in which the fire pump 114 is operated with no water flow, and data for suction and discharge pressure, revolutions per minute (RPM) and pump electrical input power are recorded. The test may continue by setting a water flow to a predetermined rate, and recording pump data, such as new suction and discharge pressures, RPM, and power consumption. The test data may be analyzed locally or sent to an outside agency or AHJ for certification of the fire pump 114.

Figure 6:
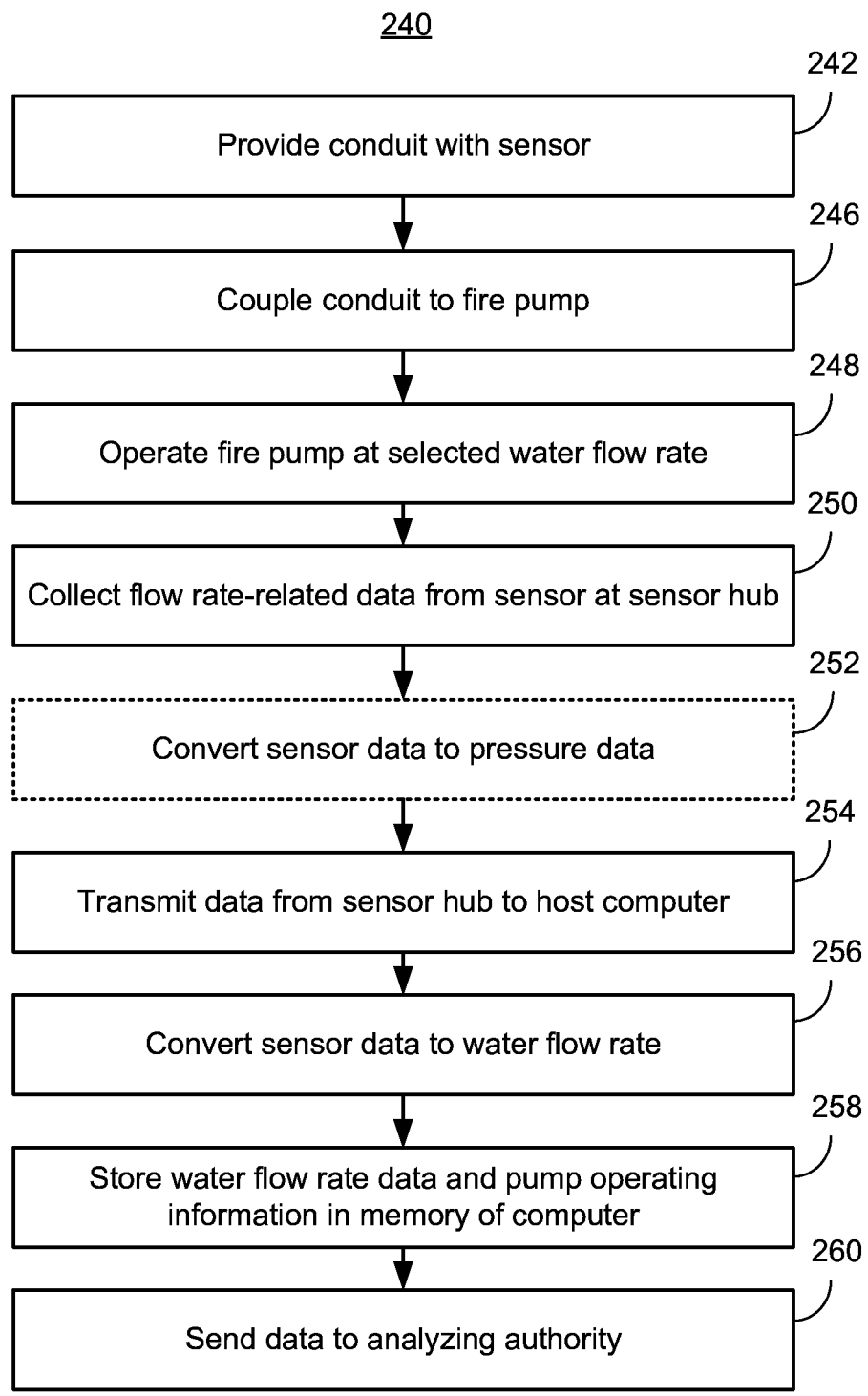
FIG. 6 is a flow chart of a method of operating a fire pump test system.

FIG. 6 is a flowchart of a method 240 of operating a system 100 for testing a fire pump, such as fire pump 114. The method 240 may begin at a block 242 by providing a conduit 110a with a sensor 106. In an embodiment the conduit may have a constant rate of area reduction that induces a laminar flow of water in the conduit 110a. The sensor 106 may measure pressure at a sidewall of the conduit 110a. Because the conduit creates a laminar fluid flow, the pressure at the sidewall can be directly related to flow rate of the fluid. At a block 246, the conduit 110a may be connected to the fire pump. In an embodiment, the conduit is placed outdoors at a convenient location to drain the water discharged by the fire pump 114.

At a block 248, the fire pump 114 may be operated at a rated flow rate. As discussed above, in some tests, the fire pump may be operated statically, that is, without any water flow before or after a dynamic test. The rated flow rate may be achieved by opening valves (not depicted) at each conduit 110a, 110b, or by operating a master valve 115 with valves at the conduit already open. It may take several minutes for changes in valve settings to stabilize throughout the pump system.

At a block 250, flow rate-related data may be collected from one or more sensors 106, 108 at a sensor hub 104. At a block 252, the flow rate-related data, such as a pressure-dependent voltage may optionally be converted into a flow rate using a conversion algorithm stored in the sensor hub 104. In other embodiments, this conversion may be done at the computer 102.

At a block 254, data may be transmitted from the sensor hub 104 to the computer 102 via a wireless network connection. In an embodiment, the data that is transmitted may be pressure data. In another embodiment, the data may be a digital value corresponding to an actual output at a sensor 106, such as a voltage or current. At block 256, after receipt of the data at the computer 102, a conversion routine 222 may convert the pressure data to a water flow rate using known characteristics at the water discharge point, for example, at conduits 110a and 110b.

At a block 258, the water flow rate data and pump operating data, such as volt-amperes of power, RPM, and suction and discharge pressures may be recorded in the memory 204 of the computer 102. In an embodiment, when the fire pump rating information is locally stored and the requirements for fire pump certification are known, the test results may be made available at the time of the test.

In other embodiments, at block 260, the stored data may be sent to an AHJ for review before the test results can be determined.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A system for managing data capture and processing about fire pump performance in a fire pump testing environment, the system comprising:
a sensor hub including:
an input that receives a signal related to a water flow rate of the fire pump from at least one sensor; and
a transmitter that transmits data corresponding to the signal from the at least one sensor via a network;
a computer that receives the data via the network from the sensor hub, the computer including:
a processor that operates according to executable instructions;
a receiver coupled to the processor that receives the data from the sensor hub via the network;
a memory coupled to the processor that stores the executable instructions, constants, and sensor-related information, the executable instructions including:
a conversion module configured to develop a flow rate of water at the at least one sensor using the data received via the receiver and information about an environment at the at least one sensor;
a pump data module that receives information about operating characteristics of the fire pump; and
an output module that calculates in real time performance of the fire pump and total water output rate of the fire pump; and
a user interface that provides a status of a test-in-progress and results of a completed test received from the output module.

2. The system of claim 1, further comprising at least one sensor.

3. The system of claim 1, wherein the computer receives information from the sensor hub via a wireless network.

4. The system of claim 1, wherein the memory has a standards data module that is used for comparing the water flow rate and operating data from the fire pump to known ratings for the fire pump to determine whether the fire pump is operating within required parameters.

5. The system of claim 1, wherein the sensor hub comprises a converter that transforms a voltage received from the at least one sensor to a pressure value, wherein the transmitter sends the pressure value to the receiver of the computer.

6. The system of claim 1, wherein the computer further comprises a look-up module that receives model information about the fire pump and returns pump-specific operating characteristics and test limit data.

7. The system of claim 6, further comprising a photograph conversion module that captures placard data of the fire pump from a photograph and provides model data extracted from the placard to the look-up module.

8. The system of claim 7, wherein the look-up module gathers operating characteristics about the fire pump from one of the memory or a remote information source.

9. A method of testing a fire pump comprising:
providing a conduit having a sensor that measures a characteristic of water flowing in the conduit;
coupling the conduit to the fire pump;
operating the fire pump at a water flow rate;
collecting flow rate-related data at the sensor;
transmitting data from the sensor via a wireless network to a computer;
converting the data from the sensor to the water flow rate at the conduit;
storing the water flow rate at the conduit and operating data from the fire pump in a memory of the computer; and
sending the water flow rate and operating data from the fire pump to an authority for evaluation.

10. The method of claim 9, wherein transmitting the data from the sensor comprises:
transmitting a voltage signal from the sensor to a sensor hub;
converting the voltage signal to a pressure measurement at the sensor hub; and
transmitting the pressure measurement from the sensor hub to the computer via the wireless network.

11. The method of claim 10, further comprising:
receiving at the sensor hub a plurality of voltage signals from each of a respective plurality of sensors coupled to the sensor hub.

12. The method of claim 9, wherein the wireless network is one of a WiFi (802.11x) network, a Bluetooth® network, and a Zigbee network.

13. The method of claim 9, further comprising:
operating the fire pump without water flow and capturing operating characteristics about the fire pump at the computer.

14. The method of claim 9, further comprising:
calculating, at the computer, the water flow rate at the conduit based on the data transmitted from the sensor.

15. The method of claim 14, further comprising:
coupling additional conduits to the fire pump; and
calculating, at the computer, a total water flow rate as a sum of water flow rates through each of the additional conduits coupled to the fire pump.

16. The method of claim 9, further comprising:
extracting model data for the fire pump from an image of a placard of the fire pump stored in the memory of the computer; and
using the model data to determine the water flow rate.

17. The method of claim 16, wherein using the model data to determine the water flow rate comprises using model data for the fire pump to query a database of pump information.

18. The method of claim 9, wherein the authority has jurisdiction to determine whether the water flow rate and operating data from the fire pump meets local requirements.

* * * * *